US009708138B2

(12) United States Patent
Veselov et al.

(10) Patent No.: US 9,708,138 B2
(45) Date of Patent: Jul. 18, 2017

(54) VACUUM-PNEUMATIC DEVICE FOR CONVEYING GRANULAR MATERIALS HAVING HIGH MASS CONCENTRATION

(71) Applicant: TWIN TRADING COMPANY, Moscow (RU)

(72) Inventors: Vladimir Mihailovich Veselov, Moscow (RU); Viktor Mihailovich Zalevsky, Moscow (RU); Veniamin Sergeevich Volodin, Vidnoye (RU); Vitaly Grigorievich Tamurka, Moscow (RU); Nikolay Aleksandrovich Gukasov, Moscow (RU); Fedor Maksimovich Sevostyanov, Moscow (RU)

(73) Assignee: TWIN TECHNOLOGY COMPANY, Moscow (RU)

( * ) Notice: Subject to any disclaimer, the term of this patent is extended or adjusted under 35 U.S.C. 154(b) by 0 days.

(21) Appl. No.: 15/032,367

(22) PCT Filed: Oct. 28, 2014

(86) PCT No.: PCT/RU2014/000816
§ 371 (c)(1),
(2) Date: Apr. 27, 2016

(87) PCT Pub. No.: WO2015/065248
PCT Pub. Date: May 7, 2015

(65) Prior Publication Data
US 2016/0280473 A1    Sep. 29, 2016

(30) Foreign Application Priority Data
Oct. 31, 2013 (RU) ............................. 2013 148616

(51) Int. Cl.
*B65G 53/26* (2006.01)
*B65G 53/24* (2006.01)
(Continued)

(52) U.S. Cl.
CPC ............. *B65G 53/26* (2013.01); *B65G 53/24* (2013.01); *B65G 53/46* (2013.01); *B65G 53/60* (2013.01); *B65G 53/66* (2013.01); *B65G 2201/04* (2013.01)

(58) Field of Classification Search
CPC ........ B65G 53/26; B65G 53/46; B65G 53/60; B65G 53/66
(Continued)

(56) References Cited

U.S. PATENT DOCUMENTS 2,806,743 A * 9/1957 Hume .................... B23K 9/324
406/151
3,219,394 A * 11/1965 Moss ..................... B65G 53/24
406/152
(Continued)

FOREIGN PATENT DOCUMENTS

JP    59172327    9/1984
RU    2329938    7/2008
(Continued)

OTHER PUBLICATIONS

Evtyukov S.A., Shapunov M.M. "Guide for pneumocomplexes and pneumo-transporting equipment", St. Petersburg Publishing House LLC DNK, 2005., pp. 351-352.).

*Primary Examiner* — Joseph Dillon, Jr.
(74) *Attorney, Agent, or Firm* — Yefim Kreydin

(57) ABSTRACT

Invention refers to the pneumatic transport field, namely to vacuum-pneumatic transportation of bulk materials of high mass concentrations through the long-distance pipelines. The invention can be used in various fields of technology, (Continued)

particularly when it is necessary to carry out the technological processes and transportation processes simultaneously. The device comprises at the inlet the suction pipeline with bulk material input part having vertical and horizontal sections connected to bulk material discharger. Bulk material discharger is provided with the sluice gate and vacuum gauge and connected to vacuum pump. This connection is realized through two or more vacuum receivers, interconnected in parallel by air ducts with high-speed valves so that on the one side of the receivers the air ducts are connected to suction pipe of vacuum pump, and on the other side of the receivers the air ducts are connected to the discharger.

3 Claims, 1 Drawing Sheet

(51) Int. Cl.
*B65G 53/46* (2006.01)
*B65G 53/60* (2006.01)
*B65G 53/66* (2006.01)

(58) Field of Classification Search
USPC .................. 406/50, 85, 151, 152, 173
See application file for complete search history.

(56) References Cited

U.S. PATENT DOCUMENTS

| | | | | |
|---|---|---|---|---|
| 3,832,005 A * | 8/1974 | Hek | B01D 46/46 | 34/361 |
| 3,836,288 A * | 9/1974 | Evans | B65G 53/28 | 406/109 |
| 3,884,528 A * | 5/1975 | Shaddock | B65G 53/54 | 137/355.16 |
| 4,005,908 A * | 2/1977 | Freeman | B65G 53/28 | 406/109 |
| 4,019,641 A * | 4/1977 | Merz | B65G 53/24 | 406/116 |
| 4,221,510 A * | 9/1980 | Smith | B65G 53/24 | 406/118 |
| 4,261,672 A * | 4/1981 | Marbach | B65G 53/525 | 406/152 |
| 4,422,833 A * | 12/1983 | Miller | F04F 1/02 | 137/205 |
| 4,466,760 A * | 8/1984 | Feldsted | B65G 53/50 | 37/320 |
| 4,659,262 A * | 4/1987 | van Aalst | B65G 53/24 | 15/340.1 |
| 4,701,080 A * | 10/1987 | van Aalst | B65G 53/28 | 406/109 |
| 4,952,099 A * | 8/1990 | Drobadenko | B65G 53/30 | 406/122 |
| 5,021,149 A * | 6/1991 | Geisseler | B07B 4/02 | 209/141 |
| 5,424,042 A * | 6/1995 | Mason | G21F 9/008 | 422/159 |
| 5,776,217 A * | 7/1998 | Thiele | B01D 45/08 | 55/417 |
| 5,865,568 A * | 2/1999 | Relin | E02F 3/902 | 406/153 |
| 6,257,804 B1 * | 7/2001 | Gathmann | B05B 7/144 | 406/138 |
| 6,688,345 B1 * | 2/2004 | Iglesias | B65B 37/10 | 141/256 |
| 7,891,954 B2 * | 2/2011 | Sundholm | B01D 47/06 | 406/153 |
| 7,896,584 B2 * | 3/2011 | Sundholm | B01D 47/06 | 406/153 |
| 8,113,745 B2 * | 2/2012 | Aoki | B65G 53/525 | 406/126 |
| 8,147,169 B1 * | 4/2012 | Kvalheim | B65G 53/40 | 406/109 |
| 8,360,691 B2 * | 1/2013 | Moretto | B65G 53/66 | 406/122 |
| 8,430,605 B2 * | 4/2013 | Dietterich | B65G 23/00 | 290/43 |
| 9,187,267 B2 * | 11/2015 | Abramov | B65G 53/26 | |
| 2007/0218816 A1 * | 9/2007 | Shimizu | B24C 7/0069 | 451/88 |
| 2010/0034599 A1 * | 2/2010 | Snowdon | B01J 8/0025 | 406/12 |
| 2010/0212589 A1 * | 8/2010 | Mauchle | B05B 7/1404 | 118/694 |
| 2011/0211919 A1 * | 9/2011 | Rasner | B65G 53/24 | 406/14 |
| 2011/0265716 A1 * | 11/2011 | Ainsworth | B05B 15/1211 | 118/602 |
| 2011/0284027 A1 * | 11/2011 | Logan | B08B 9/08 | 134/10 |
| 2014/0348597 A1 * | 11/2014 | Moretto | B65G 43/08 | 406/31 |
| 2014/0356079 A1 * | 12/2014 | Rusterholz | B65G 53/525 | 406/147 |
| 2015/0232286 A1 * | 8/2015 | Abramov | B65G 53/26 | 406/85 |
| 2015/0375935 A1 * | 12/2015 | Sundholm | B65F 5/005 | 406/151 |
| 2016/0075053 A1 * | 3/2016 | Martin | F26B 5/12 | 53/432 |

FOREIGN PATENT DOCUMENTS

SU 2058256 4/1973
SU 1463664 7/1989

* cited by examiner

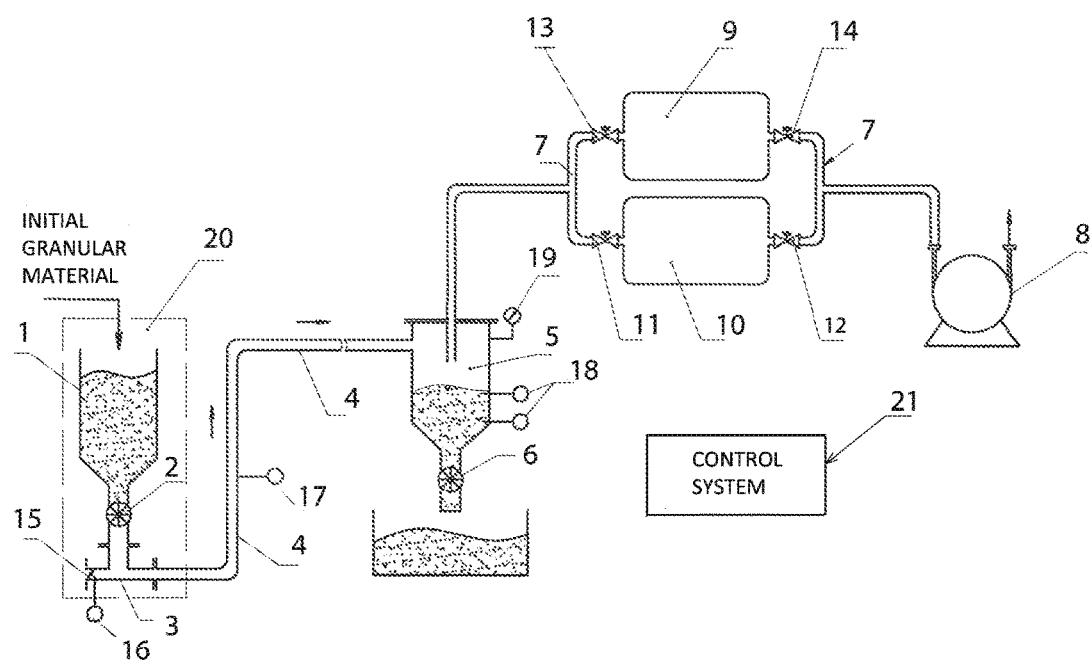

VACUUM-PNEUMATIC DEVICE FOR CONVEYING GRANULAR MATERIALS HAVING HIGH MASS CONCENTRATION

The invention relates to an area of suction vacuum-pneumatic transportation of bulk materials of high mass concentrations and corresponding to fluidized state of bulk materials with a mass concentration factor from 40 to 200 transported through the pipelines (Evtyukov S. A., Shapunov M. M. "Guide for pneumocomplexes and pneumo-transporting equipment", St. Petersburg Publishing House LLC DNK, 2005, p.p. 351-352.). Sometimes such a transport is called as dense layer vacuum transport (DLVT).

The invention can be used in various fields of technology where it is necessary to intensify the processes of transportation of bulk materials, and especially in those cases where the processes must be carried out with the transportation of bulk material having a high mass concentration. All known devices for vacuum transportation are realized due to the difference between atmospheric pressure in a place to start the moving of bulk materials through a transport pipeline and rarefication value in a place to stop the transporting of bulk materials. Effective aspiration, low power consumption in case of significant distance of transportation distinguish the vacuum transport of high mass concentration from a large part of known devices based on pneumatic transportation of bulk materials, operations of which is based on the use of compressed air power. These devices are energy intensive, operated at pressures significantly higher than atmospheric one, require compressor equipment and equipped with sophisticated systems to avoid dust discharge and grinding of materials.

A vacuum-pneumatic device is currently in use (RF patent No 22329938, IPC V65G 67/24 of 27 Jul. 2008.) to unload the residues of cargo transported, including the intake body, movable with respect to the bulk material, suction pipeline, separator of bulk material equipped with a discharge device, the unit for generating air flow and pressure pipeline connected to intake body.

The disadvantage of this device is that it is intended for vacuum suction of only minor amounts of bulk material of very low concentrations and can not be used for continuous transportation of bulk materials of high mass concentrations. It does not provide the elements to create the fluidized bed both at the start point of transportation and during the movement of bulk material in vertical and horizontal directions.

The closest to the technical nature of the proposed device (prior art) is a pneumatic suction unit for continuous loading and unloading of bulk material (RF patent number 2,058, 256, IPC V65G53/24 from 20 Apr. 1996), containing vacuum pump, suction pipeline having vertical and horizontal sections, wherein a horizontal section is made being rotatable by a drive, connected to the suction pipe of vacuum pump via a discharger of bulk material provided with a sluice gate and filter, and a part to put the bulk material into the suction pipeline and also a vacuum gauge installed in the discharger, an adjustable damper installed in the pressure pipeline, a material-air mixture concentration sensor, installed in a cavity of suction pipeline, and an airflow sensor and operation control system of the unit.

A disadvantage of currently in use unit is that it does not allow transporting the bulk materials through the pipelines at lower speeds in the range of 4 to 12 m/sec and of high concentrations. The intake of bulk material from a heap into a pipeline by air flow, according to the prior art, takes place at a speed exceeding 15 m/sec, which is higher than the suspension velocity of the most part of bulk materials. This excess disturbs a condition for creating a regime of fluidization of bulk materials of high mass concentrations and their transportation. This occurs because of, that according to prior art, a part of the air required for transporting is fed from the exhaust pipe of vacuum pump and enters the intake device through the pressure pipeline, increasing the speed of bulk material.

In a horizontal section of the transportation the bulk material has a tendency to settle down to form the immovable layers at the bottom of the pipeline, resulting in occurring the "debris" with the channels at the top and air breakthrough without performing any useful work for transportation. Rotation of horizontal section of the pipeline to perform the fluidizing state is inefficient, since it creates a force pressing the bulk material to the walls of pipeline and causes the additional resistance for movement and causes abrasion of material against the walls of pipeline and wear thereof. And with it, it should be noted that for the long-distance horizontal sections of transportation it is rather difficult to ensure the creation of the design of rotating pipes for the reasons of reliability of the seals in interface areas between rotating and stationary parts of the pipeline, since the sealing of interface areas must exclude the loss of working vacuum. Design solutions of these parts are usually metal, energy intensive, and convert pipeline transport to a mechanical conveyor.

The technical task of the claimed invention is to provide transportation of bulk material of high mass concentration in horizontal, especially long-distance sections at low energy consumption.

This technical task solution is achieved by the vacuum-pneumatic device for the transportation of bulk materials, comprising a vacuum pump, a discharger of bulk material provided with a sluice gate and a vacuum gauge connected to the suction pipe of the vacuum pump, suction pipeline with an input part of bulk material having vertical and horizontal sections in turn connected to the discharger, and a control system according to the invention is provided with two or more vacuum receivers interconnected in parallel by the air ducts with high-speed valves so that on the one side of the receiver the air ducts are connected to the suction pipe of the vacuum pump and on the other side of the receivers the air-ducts are connected to the discharger.

The part to put the bulk material into the suction pipeline can be made as a T-piece, one of its branch pipes is connected to the inlet of the suction pipeline, in the second branch pipe, which is coaxial to the first one an adjustable damper and air-flow sensor are installed sequentially, and on the third upper branch pipe a gate-feeder with a variable drive and a feed hopper for the original bulk material are installed successively.

Gate-feeder may be configured as a rotor-sluice design.

The device may be provided with a material-air mixture concentration sensor installed in the suction pipeline.

The proposed combination of features of claimed invention allows providing for constant transportation of fluidized particles of bulk material, which is characterized by high mass concentration and the velocities less than the suspension velocity in horizontal, especially long-distance sections at reducing energy consumption.

This is achieved by maintaining the required mass concentrations over the pipeline cross section that allows realizing fluidization of bulk material in all sections of the pipeline, without creating blockages due to alternative action on the air in the discharger and transport pipeline by vacuum impulses from one of two or more vacuum receivers, which are alternately connected and disconnected by control system commands, and they forms pressure reduction front spreading all over the channel of transportation and supporting the bulk material in fluidized state.

The FIGURE schematically shows the device for vacuum-pneumatic transportation of bulk materials of high mass concentration. The device consists of bulk material input part (20) comprising bulk material hopper (1), which is under atmospheric pressure, gate-feeder with a variable drive (2) located at the bottom of hopper (1) and T-piece input part (3) connected to gate-feeder (2) with its upper branch pipe, suction transportation pipeline with horizontal and vertical sections (4) connected to one of the branch pipes of T-piece input part (3) on the one hand, and discharger (5) with sluice gate (6) on the opposite side with another branch pipe coaxial to upstream one, vacuum receivers (9) and (10), interconnected in parallel by air ducts (7) with high-speed valves (11, 12, 13), which (14) connect the suction pipe of vacuum pump (8) to discharger (5). T-piece of input part (3) is provided with an air supply adjustable damper (15) and airflow sensor (16) and transporting pipeline (4) is provided with material-air mixture concentration sensor (17). In discharger (5), the detectors of upper and lower levels of bulk material (18) and vacuum gauge (19) are installed. Control system (21) with its input is connected to control means (16, 17, 18) and (19) and with its output is connected to high-speed valves (11, 12, 13) and (14), adjustable damper actuators (15), gate-feeder (2), sluice gate (6) of discharger (5).

Operation of the device for vacuum-pneumatic transportation of bulk materials of high mass concentration is realized as follows.

Vacuum pump (8) start is performed at closed valves (11) and (13) and open valves (14) and (12) and closed damper (15). After reaching the preset pressure values in receivers (9) and (10) close valve (12) synchronously with valve (11) opening. As a result, in the intake zone of discharger (5) and transporting pipeline (4) a vacuum impulse at a pressure sufficient to start transportation is created. Bulk material under atmospheric pressure enters transporting pipeline (4). Due to pressure difference value reached between hopper (1) and discharger of the intake zone (5) and damper (15) opening by a dimension corresponding to air supply required for high mass concentration of bulk material, the conditions for transportation are created.

Simultaneously with valve (11) opening, the bulk material flow from hopper (1) by gate-feeder (2) is fed into the cavity of T-piece of input part (3). From this point the bulk material is transported continuously through pipeline (4) consisting of vertical and horizontal sections into discharger (5) by air stream, which is sucked through the adjustable cross-section of the damper (15) due to negative pressure created in suction pipeline (4) and discharger (5) by vacuum receivers (9) or (10) connected by air-ducts (7) with valves (11, 12, 13, 14) to vacuum pump (8). The movement of bulk material, which has started due to the action of pressure reduced front created by vacuum receiver (10) in the initial section of the transporting pipeline is characterized by high mass concentration of bulk material over the cross section of the transporting pipeline. Passing of pressure reduction front of vacuum impulse action along the channel also result in further increase of particle velocity component, which is directed toward the intake zone.

During further movement of bulk material from intake area to vertical and horizontal directions, the particle velocity losses increase due to the friction against the channel walls, and mutual impact and pressure increase in connected vacuum receiver. Gradually slowdown of particles occurs up to the stop of bulk material layers at the bottom, most often of horizontal channel. Movement, started as uniformed can be broken due to redistribution of concentration over the cross-section and settling down of particles in near-wall area of the transporting pipeline.

In discharger (5), the airflow is separated from bulk material and through open valve (11) enters the receiver (10). Pressure value in discharger (5) increases to a value, at which the slowdown of bulk material particles and their settling down in the transporting pipeline occur. By data of sensors (16, 17) and (19) entering the control system, this value generates a command for opening valves (13) and (12), and synchronous with them closing valve (11) and (14). Repeated impulse pressure decrease in discharger (5) after opening valve (13) leads to the fact that the spreading of pressure reduction front along the channel to the direction of intake zone, which occurs with sonic speed, provides the maintaining of fluidization state and transportation of bulk material.

To maintain the constant process of transportation of bulk material by opening or closing valves (11, 12, 13) and (14) the alternately connection of receivers (10) and (9) to discharger is performed (5).

The time during which the slowdown of bulk material particles occurs, accompanied by an increase in pressure in discharger (5) and the disturbance of homogeneity of mass concentration over the cross section after the start of bulk material transportation is commensurate with the time of vacuum impulse action and the time for vacuum build-up in vacuum receivers. While transporting bulk material of high mass concentration the losses, resulted from friction, decrease sharply, and this gives the opportunity to increase the transportation distance under constant capacity of vacuum pump.

Data of air speed sensor (16) located immediately downstream the adjustable damper (15), material-air mixture concentration sensor (17) located in the cavity of the suction pipeline and vacuum gauge (19) along with a controlled feed of bulk material by gate-feeder (2) and sensors of upper and lower levels (18) allows creating the transportation mode of high mass concentration using the control system. Action of vacuum impulses on the air in discharger (5) generates a pressure reduction front spreading along the transportation channel and supports the bulk material in fluidized state with uniform high mass concentration over the channel cross-section, thereby compensating the losses of speed of particles and providing the transportation in long-distance sections of the pipeline. Periodic repetition of this action by connecting and disconnecting one of two or more receivers will ensure the consistency of transportation process.

Therefore, alternating impulse action of reduced pressure front spreading along the transportation channel on bulk material allows realizing its constant transportation with high mass concentration in vertical and horizontal long-distance sections, including ones with various elements, which change the direction of transportation at simultaneous reducing energy consumption.

The invention claimed is:
1. A device for vacuum-pneumatic transportation of bulk materials of high mass concentration comprising
   a vacuum pump,
   a discharger for bulk material, said discharger provided with a sluice gate and a vacuum gauge and connected to a suction pipe of the vacuum pump,
   a suction pipeline connected to the discharger, said suction pipeline having vertical and horizontal sections, a input unit of bulk material, installed at an inlet of said suction pipeline, wherein at least two vacuum receivers and are connected by an one end to said discharger said at least two vacuum receivers and are interconnected in parallel by air ducts with high-speed valves, said valves are installed at an inlet and an outlet of each receiver and, and a second end of said receivers is connected to the suction pipe of said vacuum pump.

2. The device for vacuum-pneumatic transportation of claim 1, wherein said input unit has a T-piece, one branch pipes of the T-piece is connected to an inlet of said suction pipeline, in a second branch pipe of said T-piece, which is coaxial to the first one, adjustable damper and airflow sensor are installed sequentially, and a third branch pipe of said of T-piece is designed to connect a feed hopper for starting bulk material with a variable gate-feeder.

3. The device for vacuum-pneumatic transportation of claim 1, wherein said suction pipeline is provided with material-air mixture concentration sensor.

\* \* \* \* \*